United States Patent
Hoff et al.

(10) Patent No.: US 10,036,480 B2
(45) Date of Patent: Jul. 31, 2018

(54) CLAMPED BONNET ASSEMBLY FOR AN AXIAL FLOW VALVE AND AXIAL FLOW VALVE COMPRISING SAME

(71) Applicant: FISHER CONTROLS INTERNATIONAL LLC, Marshalltown, IA (US)

(72) Inventors: Elliot J. Hoff, Ames, IA (US); Ross A. Schade, Ames, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 29 days.

(21) Appl. No.: 14/919,782

(22) Filed: Oct. 22, 2015

(65) Prior Publication Data

US 2016/0123488 A1    May 5, 2016

Related U.S. Application Data

(60) Provisional application No. 62/073,752, filed on Oct. 31, 2014.

(51) Int. Cl.

| | |
|---|---|
| *F16K 27/04* | (2006.01) |
| *F16K 3/02* | (2006.01) |
| *F16K 31/50* | (2006.01) |
| *F16K 3/24* | (2006.01) |

(52) U.S. Cl.
CPC .......... *F16K 27/044* (2013.01); *F16K 3/0218* (2013.01); *F16K 3/0227* (2013.01); *F16K 3/0254* (2013.01); *F16K 3/24* (2013.01); *F16K 31/508* (2013.01)

(58) Field of Classification Search
CPC .... F16K 27/044; F16K 3/0218; F16K 3/0227; F16K 3/0254; F16K 31/508; F16K 47/08
See application file for complete search history.

(56) References Cited

U.S. PATENT DOCUMENTS

| | | | | |
|---|---|---|---|---|
| 3,917,221 A | * | 11/1975 | Kubota | F16K 47/08 137/625.37 |
| 4,327,757 A | * | 5/1982 | Weevers | F16K 47/08 137/219 |
| 4,617,963 A | * | 10/1986 | Stares | F16K 47/08 137/625.3 |

(Continued)

FOREIGN PATENT DOCUMENTS

KR    20140011156 A    1/2014

OTHER PUBLICATIONS

Search Report for International application No. PCT/US2015/058179, dated Feb. 1, 2016.

(Continued)

*Primary Examiner* — Craig Schneider
*Assistant Examiner* — Kevin Barss
(74) *Attorney, Agent, or Firm* — Marshall, Gerstein & Borun LLP

(57) ABSTRACT

A clamped bonnet assembly for an axial flow control valve includes a clamped bonnet, a valve seat, and a cage, the cage being clamped directly between the clamped bonnet and the valve seat. The clamped bonnet assembly enhances manufacturability and machinability due to the removability of the clamped bonnet assembly from the control valve body.

9 Claims, 4 Drawing Sheets

(56) References Cited

U.S. PATENT DOCUMENTS

| | | | | |
|---|---|---|---|---|
| 6,244,297 | B1* | 6/2001 | Baumann | F16K 47/08 |
| | | | | 137/625.3 |
| 6,991,218 | B2* | 1/2006 | Lovell | F16K 1/482 |
| | | | | 251/357 |
| 7,963,502 | B2* | 6/2011 | Lovell | F16K 41/02 |
| | | | | 251/214 |
| 8,297,315 | B2* | 10/2012 | Esveldt | F16K 1/12 |
| | | | | 137/625.3 |
| 2003/0196698 | A1 | 10/2003 | Lin et al. | |
| 2009/0272929 | A1 | 11/2009 | Bey et al. | |

OTHER PUBLICATIONS

Written Opinion for International application No. PCT/US2015/058179, dated Feb. 1, 2016.
International Preliminary Report on Patentability for International application No. PCT/2015/058179, dated May 2, 2017.

* cited by examiner ative to the valve port 18 in order to control the flow of
CLAMPED BONNET ASSEMBLY FOR AN AXIAL FLOW VALVE AND AXIAL FLOW VALVE COMPRISING SAME

FIELD OF THE INVENTION

The present invention relates generally to fluid control valves and, more specifically, to axial flow control valves having a clamped bonnet assembly.

BACKGROUND

Control valves are commonly employed in fluid or gas distribution systems to control the pressure in the system downstream of the control valve. The pressure at which a gas distribution system supplies gas may vary according to the demands placed on the system, the climate, the source of the supply, and/or other factors. However, most end-user facilities equipped with, for example, gas appliances such as furnaces, ovens, etc., require the gas to be delivered in accordance with predetermined pressure parameters. Therefore, such distribution systems use control valves to ensure that the delivered gas meets the requirements of the end-user facilities.

In fluid or gas control valves (collectively "fluid control valves"), a number of design and performance considerations may be important. For example, designers of fluid control valves may strive to design control valves that have greater pressure stability and reduced sensitivity to inlet pressure variations. Further, designers may strive to construct more compact designs, and designs which might favor easy assembly and service.

Several types of fluid control valves are known, for example, sliding stem control valves, rotary control valves, etc. In some control valves fluid flow through the valve is turned by 90 degrees or more as the fluid passes through a valve seat. The 90 degree turn is necessary because an actuator for the valve is oriented generally perpendicular to the fluid flow direction and a valve plug is oriented parallel to actuator movement (i.e., perpendicular to the fluid flow direction) to simplify the actuator-valve plug interface. However, in some applications some control valves may suffer from vibration and loss of valve efficiency due to the turning fluid flow path through the regulator.

Axial or in-line flow control valves are an alternative to control valves having a 90 degree turn. Axial flow valves have a flow path or passageway through the valve that is substantially straight or parallel to the fluid flow direction to minimize turbulent flow through the valve body. While the flow path or passageway may not be exactly straight or parallel, the flow path or passageway may include a turn that is significantly less than 90 degrees, which can reduce vibrations and losses of efficiency.

Axial flow control valves typically include an actuator mounted to an exterior surface of a valve body. The actuator is operatively coupled to a flow control member of the valve and moves the flow control member between an open position and a closed position to allow or prevent the flow of fluid through the valve. Some known axial flow control valves actuate a flow control member within the valve body relative to a seat ring to control fluid flow through the valve body.

However, axial flow control valves suffer from the need for precise internal machining and long assembly times.

DETAILED DESCRIPTION

For the purposes of this application, an axial flow control valve is defined as a control valve having a fluid flow path or passageway that includes less than 30 degrees deviation through the valve trim.

Figure 1:
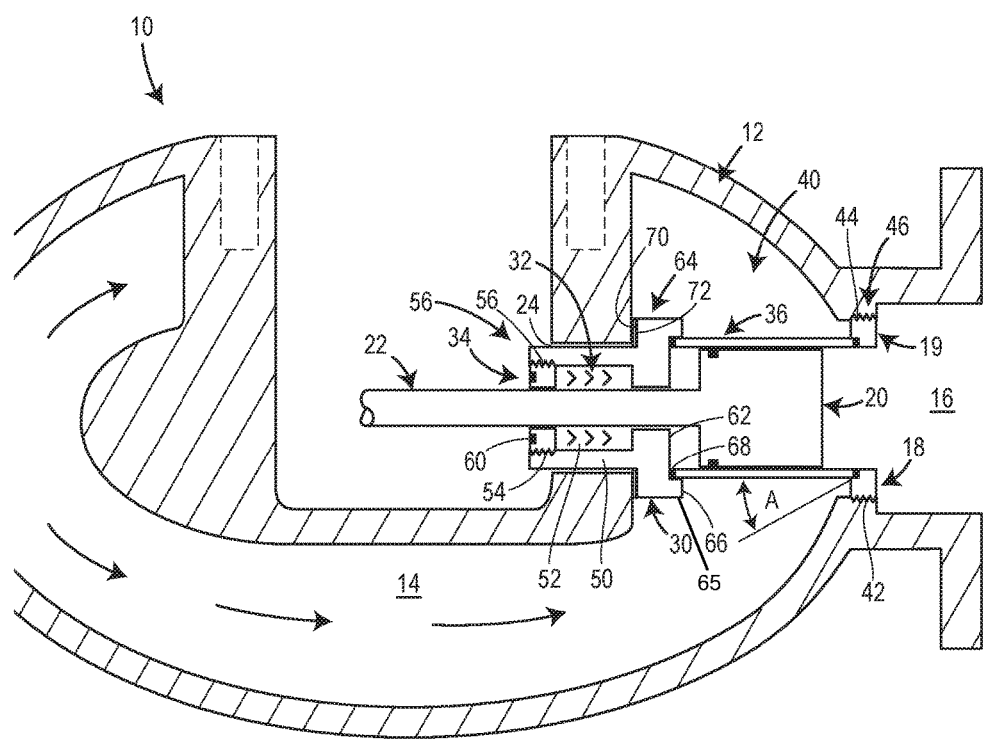
FIG. 1 is a cross-sectional view of an axial flow control valve including a clamped bonnet assembly.

Referring now to the drawings, FIG. 1 illustrates an axial flow control valve assembled in accordance with the teachings of a first disclosed example of the present invention and referred to by the reference numeral 10. The axial flow control valve 10 includes a valve body 12 including a valve inlet 14, a valve outlet 16, and a valve port 18. A cylindrical control element 20 is shiftably disposed within the valve body 12, such that the control element 20 can be displaced relative to the valve port 18 in order to control the flow of the fluid between the inlet 14 and the outlet 16. The valve port 18 may include a valve seat or seat ring 19. As would be understood by those of skill in the art, control of fluid through the fluid regulating device can be controlled by moving the control element 20 between the open position as shown in FIG. 1 in which the control element 20 is spaced away from the valve seat 19, and a closed position (not shown) in which the control element 20 is seated against the valve seat 19.

In the disclosed axial flow control valve 10, fluid flowing from the inlet 14 to the outlet 16 changes direction slightly, forming an angle A. The angle A is less than 30 degrees, preferably less than 20 degrees and more preferably less than 10 degrees.

The fluid regulating device 10 further includes an actuator (not shown in FIG. 1) which moves the control element 20 with respect to the valve seat 19. The control element 20 may include a stem 22 extending from one end for operatively connecting the control element 20 to the actuator.

The valve body 12 may include an opening 24 through which the stem 22 extends in order to operatively connect to the externally mounted actuator (not shown in FIG. 1). A clamped bonnet 30 may be disposed at least partially within the opening 24, the clamped bonnet 30 sealing the opening 24 around the stem 22. Sealing packing 32 may be disposed within one end of a hollow bore in the clamped bonnet 30 to prevent fluid from flowing between the clamped bonnet 30 and the stem 22. In one embodiment, the packing may be made of graphite, PTFE, or any other suitable material. A packing follower 34 may trap the packing 32 between the clamped bonnet 30 and the stem 22.

A cage 36 may be disposed directly between the valve seat 19 and the clamped bonnet 30. The cage 36 may characterize fluid flowing through the valve port 18, for example, but reducing a pressure gradient or reducing cavitation. Additionally, the cage 36 may guide the control element 20 as the control element 20 reciprocates.

The clamped bonnet 30, the cage 36, and the valve seat 19 together form a clamped bonnet assembly 40.

The clamped bonnet 30, unlike traditional bonnets, may be disposed mostly within the valve body 12. In one embodiment, a majority (i.e., greater than 50%) of the clamped bonnet 30 resides within the valve body 12. Moreover, the clamped bonnet 30 is not an integral part of the valve body. Rather, the clamped bonnet 30 may be inserted into the opening 24 and held in the opening 24 by force transmitted through the cage 36 from the valve seat 19. In one embodiment, the valve seat 19 may include external threads 42, which cooperate with internal threads 44 on the valve body 12, within the valve port 18. As the valve seat 19 is secured within the valve port 18, the turning action of the threaded connection 46 draws the valve seat 19 towards the opening 24, which provides force, through the cage 36, to clamp the clamped bonnet 30 within the opening 24.

Because the clamped bonnet 30 is not an integral part of the valve body 12, the clamped bonnet 30 may be machined outside of the valve body, which enhances machinability due to larger access areas. Furthermore, the packing 32, the packing follower 34, the stem 22, and the plug 20 may be assembled outside of the valve body 12, and inserted into the valve body 12 as a sub-assembly. Thereafter, the cage 36 may be inserted into the valve body 12 and the entire clamped bonnet assembly 40 may be pressure loaded by the valve seat 19. Thus, the entire assembly operation may be easily accessed through the valve exit 16, which provides easy access to the valve port 18 and the opening 24.

The clamped bonnet 30 includes a cylindrical outer wall 50 having an outer diameter that is slightly smaller than an inner diameter of the opening 24 so that a portion of the outer wall 50 may fit with close tolerance within the opening. In one embodiment, the outer diameter of the outer wall 50 is between 0.5 mm and 2 mm smaller than the inner diameter of the opening 24. The cylindrical outer wall 50 has an inner diameter that is substantially larger than an outer diameter of the stem 22. As a result, a space 52 is created between the inner diameter of the outer wall 50 and the stem 22. In one embodiment, the inner diameter of the outer wall 50 may be between 1 cm and 3 cm larger than the outer diameter of the stem 22.

An inner threaded portion 54 may be disposed at a first end 56 of the clamped bonnet 30. The packing follower 34 may include an outer threaded portion 58, which cooperates with the inner threaded portion 54 to releasably secure the packing follower 34 to the clamped bonnet 30, thereby trapping the packing 32 within the space 52. The packing follower 34 may be adjusted from outside of the valve body 12 to provide a proper loading force to the packing 32, or to adjust the loading force during operation of the valve 10 to produce a fluid tight seal between the clamped bonnet 30 and the stem 22. To facilitate adjustment of the packing follower 34, the packing follower 34 may include one or more tool receiving features 60.

An internal flange 62 may extend radially inward from a second end 64 of the clamped bonnet 30. An external flange 65 may extend radially outward from the second end 64 of the clamped bonnet 30. The external flange 65 may include a lip 66 that extends longitudinally outward from the external flange 64, the external flange 64 and the lip 66 forming a cage seat 68.

The external flange 65 may have an outer diameter that is larger than the inner diameter of the opening 24. In one embodiment, the outer diameter of the external flange is between 2 cm and 4 cm larger than the inner diameter of the opening 24. As a result, a sealing surface 70 is formed opposite the cage seat 68. The sealing surface 70 abuts the valve body 12 proximate the opening 24. The force provided by the valve seat 19, through the cage 36, pushes the external flange 65 against the valve body 12. In other words, the external flange 65 is clamped directly between the cage 36 and the valve body 12. An optional sealing gasket 72 may be disposed between the external flange 65 and the valve body 12 to provide a fluid tight seal between the clamped bonnet 30 and the valve body 12.

Figure 2:
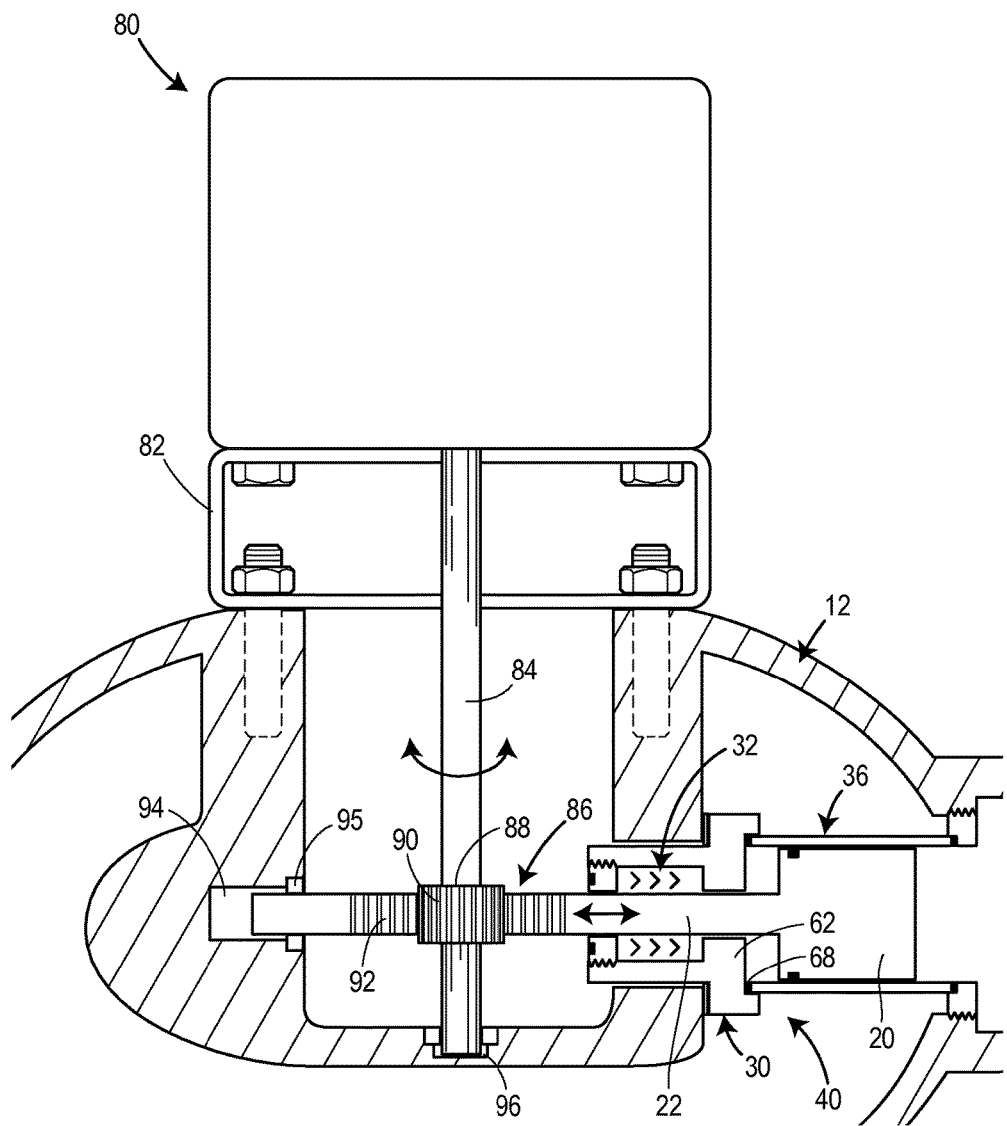
FIG. 2 is a cross-sectional view of an axial flow control valve including a clamped bonnet assembly and a rotary actuator.
Figure 3:
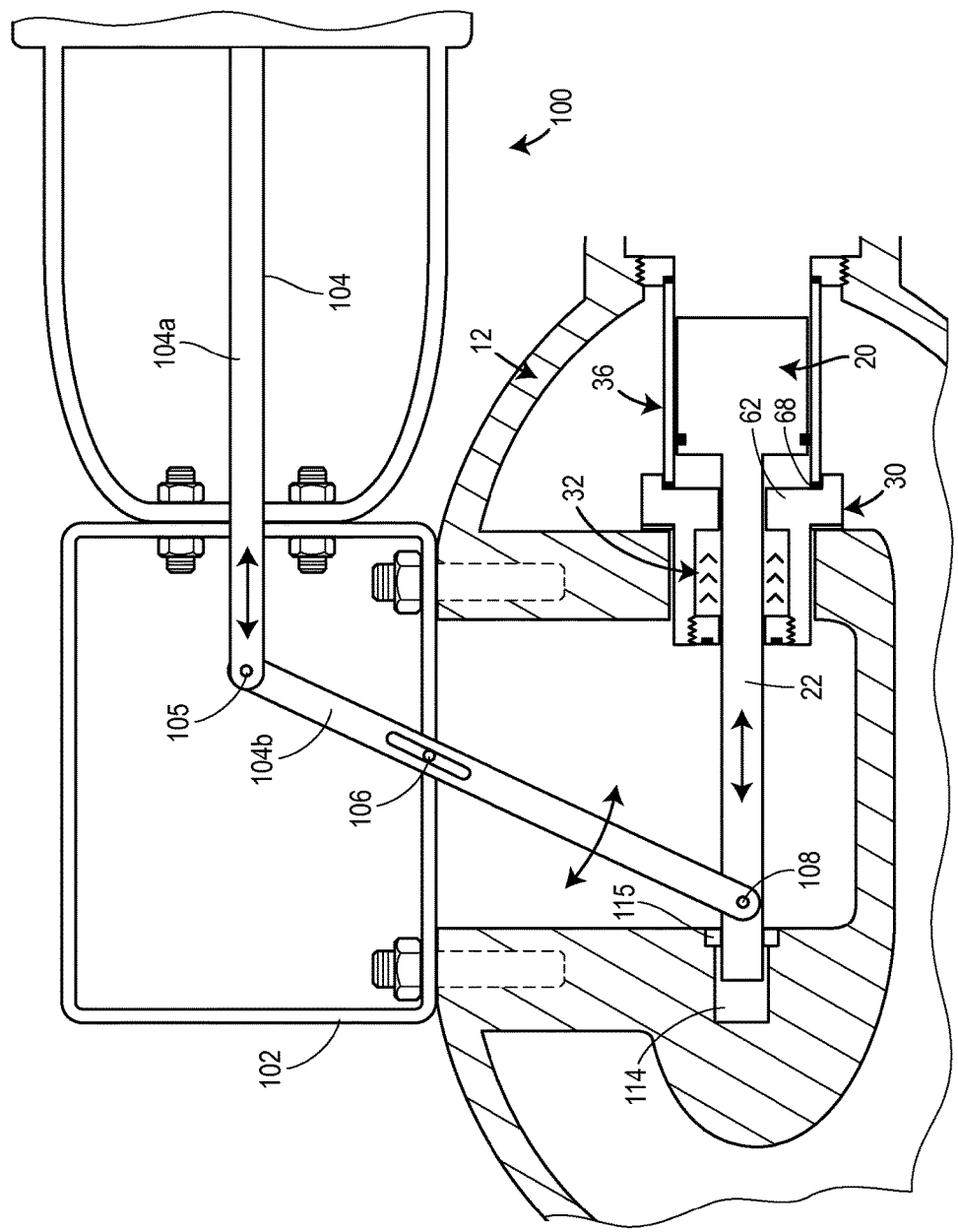
FIG. 3 is a cross-sectional view of an axial flow control valve including a clamped bonnet assembly and a linear actuator.
Figure 4:
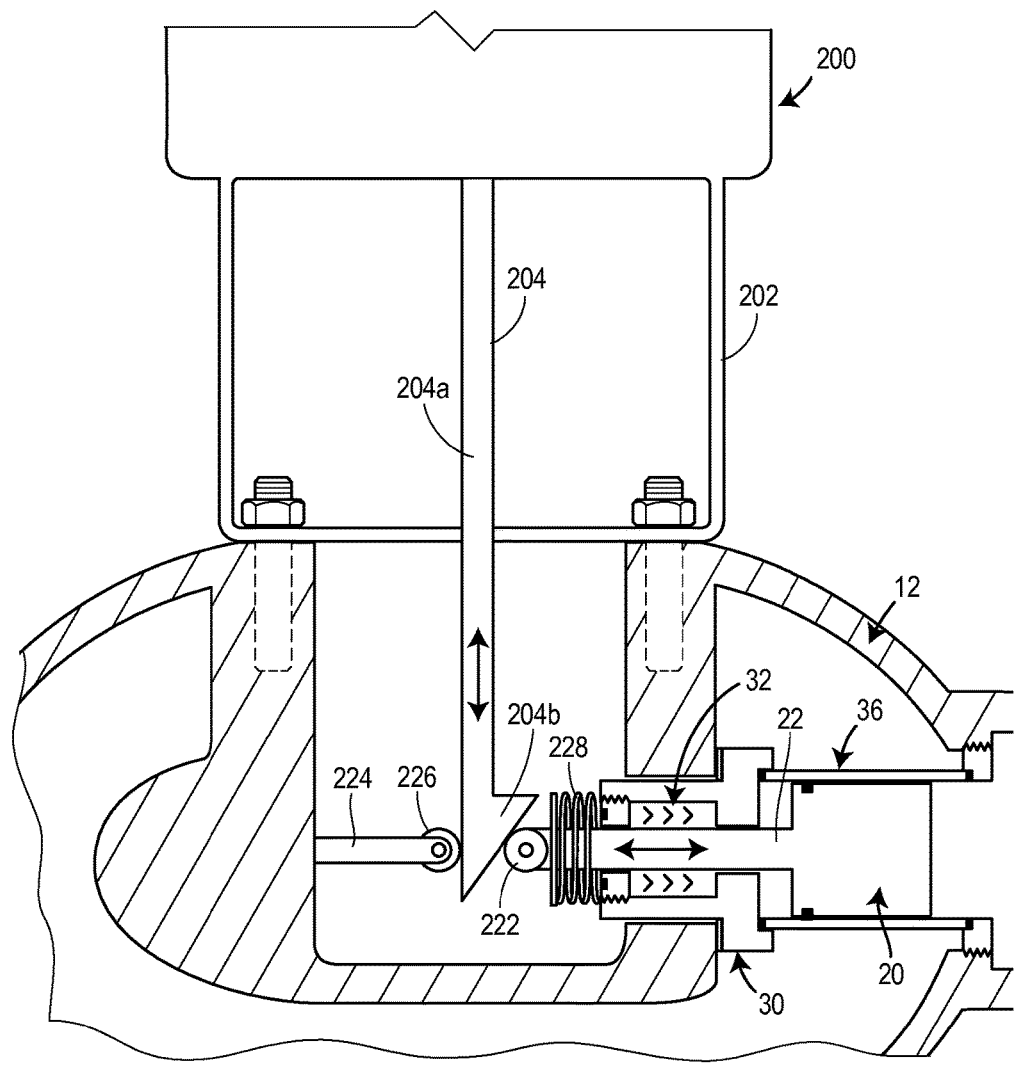
FIG. 4 is a cross-sectional view of an axial flow control valve including a clamped bonnet assembly and an alternate embodiment of a linear actuator.

The control element 20 may be actuated by a wide range of actuators. For example, the control element 20 may be actuated by a rotary actuator or a linear actuator. FIGS. 2-4 illustrate various actuators that may be used with the disclosed clamped bonnet assembly 40.

FIG. 2 illustrates one example of a rotary actuator 80. The rotary actuator 80 may be mounted to the valve body 12 with a mounting bracket 82. A rotary shaft 84 operatively connects the rotary actuator 80 to the stem 22 with a rack and pinion connection 86. The rack and pinion connection 86 may include a rotary gear 88 having plurality of teeth 90 that interact with a plurality of teeth 92 on the stem 22 to convert the rotary motion of the rotary shaft 84 to linear motion of the stem 22. In the embodiment of FIG. 2, the stem 22 may extend into a recess 94 in the valve body 12 and a bearing 95 may facilitate reciprocating motion of the stem 22. Similarly, the rotary shaft 84 may extend into a recess 96 in the valve body 12 and a bearing 97 may facilitate the rotational movement of the rotary shaft 84.

FIG. 3 illustrates one example of a linear actuator 100. The linear actuator 100 may be mounted to the valve body 12 with a mounting bracket 102. A linear shaft 104 operatively connects the linear actuator 100 to the stem 22. The linear shaft 104 may comprise two linear pieces 104a and 104b that are connected at a first pivot 105. The first pivot changes the angular actuation of the linear shaft 104. A second pivot 106 changes direction of the actuation of the second piece 104a. The second piece 104a may be connected to the stem 22 with a third pivot 108 to transmit the linear force from the linear actuator 100 to the stem 22. In the embodiment of FIG. 3, the stem 22 may extend into a recess 114 in the valve body 12 and a bearing 115 may facilitate reciprocating motion of the stem 22.

FIG. 4 illustrates another example of a linear actuator 200. The linear actuator 200 may be mounted to the valve body 12 with a mounting bracket 202. A linear shaft 204 operatively connects the linear actuator 200 to the stem 22. The linear shaft 204 may comprise a linear piece 204a and a wedge end 204b. The wedge end 204b changes the reciprocating motion by approximately 90° in this example, although other angular changes are possible. The stem 22 may include a first wheel or ball element 222 at one end, the ball element 222 cooperating with the wedge end 204b to transfer the linear reciprocating motion of the linear shaft 204 to a linear reciprocating motion of the stem 22. A support arm 224 may support a second wheel or ball element 226, opposite the first ball element 222. A biasing element, such as a spring 228, may be disposed between the clamped bonnet 30 and the wedge end 204b to keep the first wheel element 222 in contact with the wedge end 204b.

In accordance with one aspect of the disclosed example, the axial flow control valve with a clamped bonnet assembly results in a more easily assembled valve and a reduced cost for manufacturing. The axial flow control valve with a clamped bonnet assembly is also easier to machine due to the fact that the majority of the machine features are removed from the valve and therefore, maneuvering around tight spaces within the valve and the use of specialty machining tools and techniques are reduced or eliminated. The assembly process is made easier due to the fact that the packing, the plug stem, and the packing loading can all be performed from outside of the valve, rather than from within the valve where there are tight spaces and minimal areas to work. The bonnet is then clamped into the valve body using a seat ring, which is easily accessible from the exterior of the valve. The ease of machining and ease of assembly. Both result in cost reductions, which increase the marketability of the valve.

Although numerous examples are shown and described herein, those of skill in the art will readily understand that details of the various embodiments need not be mutually exclusive. Instead, those of skill in the art upon reading the teachings herein should be able to combine one or more features of one embodiment with one or more features of the remaining embodiments. Further, it also should be understood that the illustrated embodiments are exemplary only, and should not be taken as limiting the scope of the invention. All methods described herein can be performed in any suitable order unless otherwise indicated herein or otherwise clearly contradicted by context. The use of any and all examples, or exemplary language (e.g., "such as") provided herein, is intended merely to better illuminate the aspects of the exemplary embodiment or embodiments of the invention, and do not pose a limitation on the scope of the invention. No language in the specification should be construed as indicating any non-claimed element as essential to the practice of the invention.

What is claimed is:

1. An axial flow control valve having a clamped bonnet assembly, the axial flow control valve comprising:
    a valve body defining an axial flow passageway between an inlet and an outlet;
    a control element disposed within the valve body, the control element controlling fluid flow through the valve body;
    a rotary actuator attached to the valve body for moving the control element; and
    a clamped bonnet assembly including:
        a clamped bonnet, the clamped bonnet having a cylindrical body and a hollow bore;
        a valve seat, the control element cooperating with the valve seat to control the flow of fluid through the control valve; and
        a cage disposed directly between the clamped bonnet and the valve seat, the cage abutting the clamped bonnet at one end and the valve seat at another end,
    wherein the clamped bonnet is disposed within an opening in the valve body, at least part of the clamped bonnet being located outside of the valve body and at least part of the clamped bonnet being located within the valve body,
    and wherein the rotary actuator comprises a rotary shaft that is connected to a stem of the control element with a rack and pinion connection.

2. The axial flow control valve of claim 1, wherein the valve seat comprises a seat ring that includes external threads.

3. The axial flow control valve of claim 1, wherein packing is disposed within one end of the hollow bore.

4. The axial flow control valve of claim 3, further comprising a packing follower within the one end of the hollow bore, the packing follower containing the packing within the hollow bore.

5. The axial flow control valve of claim 4, wherein the packing follower includes external threads that cooperate with internal threads within the hollow bore.

6. The axial flow control valve of claim 1, wherein the clamped bonnet comprises a radially extending external flange at one end.

7. The axial flow control valve of claim 6, further comprising a longitudinally extending lip extending from the external flange.

8. The axial flow control valve of claim 1, wherein the clamped bonnet comprises a radially extending internal flange at one end.

9. The axial flow control valve of claim 7, wherein the external flange and the lip form a cage seat.

* * * * *

UNITED STATES PATENT AND TRADEMARK OFFICE
CERTIFICATE OF CORRECTION

| | |
|---|---|
| PATENT NO. | : 10,036,480 B2 |
| APPLICATION NO. | : 14/919782 |
| DATED | : July 31, 2018 |
| INVENTOR(S) | : Elliot J. Hoff et al. |

It is certified that error appears in the above-identified patent and that said Letters Patent is hereby corrected as shown below:

In the Specification

Column 3, Line 17, "plug 20" should read -- control element 20 --.

Column 3, Lines 55-56, "external flange 64, the external flange 64" should read -- external flange 65, the external flange 65 --.

In the Claims

Column 6, Line 35, "claim 7" should read -- claim 1 --.

Signed and Sealed this
Twenty-eighth Day of April, 2020

Andrei Iancu
*Director of the United States Patent and Trademark Office*